United States Patent
Senoo

(10) Patent No.: US 10,250,106 B2
(45) Date of Patent: Apr. 2, 2019

(54) STATOR AND MOTOR PROVIDED WITH OUTER CYLINDER

(71) Applicant: FANUC CORPORATION, Yamanashi (JP)

(72) Inventor: Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 82 days.

(21) Appl. No.: 15/057,562

(22) Filed: Mar. 1, 2016

(65) Prior Publication Data

US 2016/0261174 A1    Sep. 8, 2016

(30) Foreign Application Priority Data

Mar. 6, 2015    (JP) .................................. 2015-045354

(51) Int. Cl.
*H02K 9/22*    (2006.01)
*H02K 5/20*    (2006.01)
*H02K 9/19*    (2006.01)

(52) U.S. Cl.
CPC .................. *H02K 9/22* (2013.01); *H02K 5/20* (2013.01); *H02K 9/19* (2013.01)

(58) Field of Classification Search
CPC .. H02K 9/22; H02K 5/20; H02K 9/19; H02K 3/505; H02K 3/522; H02K 3/50; H02K 3/38; H02K 3/28; H02K 3/24; H02K 15/0037
USPC .......................................... 310/260, 270, 64
See application file for complete search history.

(56) References Cited

U.S. PATENT DOCUMENTS

| 3,075,250 | A | * | 1/1963 | Strohm | ................... | H02K 15/12 |
| | | | | | | 264/272.2 |
| 4,442,371 | A | * | 4/1984 | Utsunomiya | ............ | H02K 9/00 |
| | | | | | | 310/260 |
| 5,276,374 | A | * | 1/1994 | Geller | ..................... | H02K 3/24 |
| | | | | | | 310/260 |
| 7,102,267 | B2 | * | 9/2006 | Gromoll | .................. | H02K 9/14 |
| | | | | | | 310/260 |
| 7,745,969 | B2 | * | 6/2010 | Lyschick | .................. | H02K 3/50 |
| | | | | | | 242/432.6 |

(Continued)

FOREIGN PATENT DOCUMENTS

| CN | 1560982 A | 1/2005 |
| CN | 203674894 U | 6/2014 |

(Continued)

OTHER PUBLICATIONS

English Abstract and Machine Translation for Japanese Publication No. 2013-126292 A, published Jun. 24, 2013, 31 pgs.

(Continued)

*Primary Examiner* — Naishadh Desai
(74) *Attorney, Agent, or Firm* — Fredrikson & Byron, P.A.

(57) ABSTRACT

A stator which prevents deformation of component elements of the stator and which effectively removes heat generated by coils at the time of operation. The stator of a motor comprises a stator core having a cylindrical back yoke and teeth projecting out from the back yoke to the inside in the diametrical direction, coils wound around the teeth, an outer cylinder surrounding the back yoke, and heat conducting parts abutting against both an inner circumferential surface of the outer cylinder and coil ends of the coils.

9 Claims, 13 Drawing Sheets

(56) References Cited

U.S. PATENT DOCUMENTS

| | | | | |
|---|---|---|---|---|
| 2002/0027396 A1* | 3/2002 | Hein | ............... | H02K 3/505 310/270 |
| 2002/0047480 A1* | 4/2002 | Heim | ............... | H02K 3/50 310/260 |
| 2010/0019609 A1* | 1/2010 | Stout | ............... | H02K 1/02 310/198 |
| 2013/0106210 A1* | 5/2013 | Tsutsui | ............... | H02K 5/128 310/52 |
| 2013/0106238 A1* | 5/2013 | Saiki | ............... | H02K 15/0037 310/260 |

FOREIGN PATENT DOCUMENTS

| | | |
|---|---|---|
| CN | 205565914 U | 9/2016 |
| JP | 10290543 A | 10/1998 |
| JP | 2002191155 A | 7/2002 |
| JP | 2004229405 A | 8/2004 |
| JP | 2005198500 A | 7/2005 |
| JP | 2012143064 A | 7/2012 |
| JP | 2013126292 A | 6/2013 |

OTHER PUBLICATIONS

English Abstract and Machine Translation for Japanese Publication No. 2004-229405 A, published Aug. 12, 2004, 16 pgs.

English Abstract and Machine Translation for Japanese Publication No. 2002-191155 A, published Jul. 5, 2002, 8 pgs.

English Abstract and Machine Translation for Japanese Publication No. 10-290543 A, published Oct. 27, 1998, 11 pgs.

English Abstract and Machine Translation for Japanese Publication No. 2012-143064 A, published Jul. 26, 2012, 13 pgs.

English Abstract and Machine Translation for Japanese Publication No. 2005-198500 A, published Jul. 21, 2005, 11 pgs.

English Abstract for Chinese Publication No. 1560982 A, published Jan. 5, 2005, 1 pg.

English Abstract and Machine Translation for Chinese Publication No. 203674894 U, published Jun. 25, 2014, 8 pgs.

English Abstract and Machine Translation for Chinese Publication No. 205565914 U, published Sep. 7, 2016, 9 pgs.

\* cited by examiner

STATOR AND MOTOR PROVIDED WITH OUTER CYLINDER

BACKGROUND OF THE INVENTION

1. Field of the Invention

The invention relates to a stator provided with an outer cylinder and to a motor.

2. Description of the Related Art

Known in the art is a stator comprised of a stator core and an outer cylinder which is arranged so as to surround the stator core and which is shrink fit etc. to fasten it to an outer circumference of the stator core and thereby prevent deformation of the stator core (for example, Japanese Patent Publication No. 2012-143064A).

In such a stator, art is sought which prevents deformation of component elements of the stator and which effectively removes heat generated by the coils at the time of operation.

SUMMARY OF INVENTION

In an aspect of the invention, a stator of a motor comprises a stator core including a cylindrical back yoke and a tooth projecting radially inside from the back yoke; a coil wound around the tooth an outer cylinder which surrounds the back yoke; and a heat conducting part which contacts an inner circumferential surface of the outer cylinder and a coil end of the coil.

The stator core may include a plurality of teeth arranged so as to align in a circumferential direction. The stator may comprise a plurality of heat conducting parts arranged so as to align in the circumferential direction. Each of the plurality of heat conducting parts may contact the coil end of the coil wound around each of the plurality of teeth.

The stator may further comprise a connecting part extending in the circumferential direction of the outer cylinder so as to be connected to the heat conducting part, and contacting the inner circumferential surface of the outer cylinder. The heat conducting part may have a radial direction width equal to or larger than that of the connecting part.

A step may be formed at the inner circumferential surface of the outer cylinder so as to extend in the circumferential direction. The heat conducting part and the connecting part may be arranged on the step. A fin for dissipating heat or a fluid path for passage of a coolant may be formed at an outer circumferential surface of the outer cylinder. The heat conducting part may include an insulator at a part thereof where the heat conducting part contacts the coil end.

In another aspect of the invention, a motor comprises the above-mentioned stator. The motor may further comprise a fan for cooling the outer cylinder.

BRIEF DESCRIPTION OF DRAWINGS

These and other objects, features, and advantages of the invention will be clarified with reference to the detailed description of illustrative embodiments of the invention shown in the attached drawings, in which.

DETAILED DESCRIPTION

Figure 1:
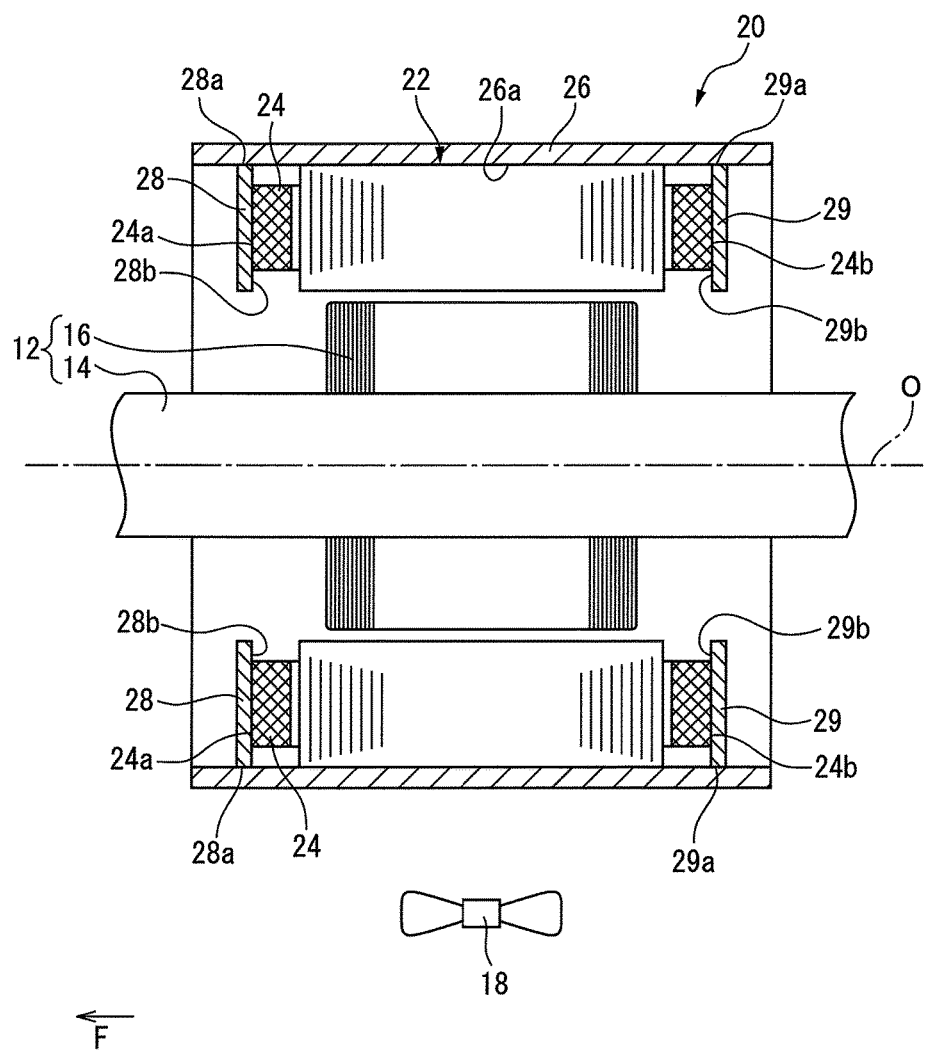
FIG. 1 is a side cross-sectional view of a motor according to an embodiment of the invention.
Figure 2:
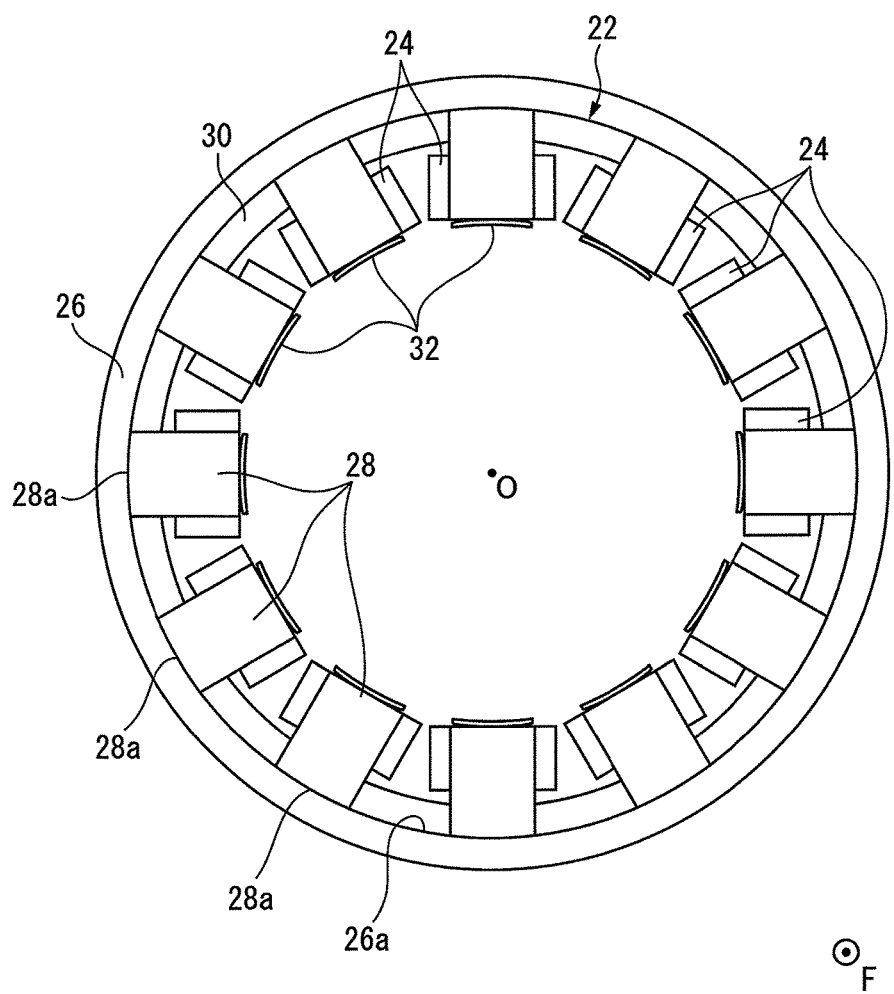
FIG. 2 is a view of the stator shown in FIG. 1 as seen from the axially front side.

Below, embodiments of the invention will be explained in detail based on the drawings. First, referring to FIG. 1, a motor 10 according to an embodiment of the invention will be explained. Note that, in the following explanation, the axial direction indicates a direction along the axis O of the shaft 14 shown in FIG. 1, the radial direction indicates a radial direction of a circle centered about the axis O, and the circumferential direction indicates a circumferential direction of the circle centered about the axis O. Further, for convenience, the direction of the arrow F shown in the figures indicates the frontward in the axial direction (i.e., axially frontward).

The motor 10 includes a stator 20, a rotor 12 rotatably arranged radially inside of the stator 20, and a fan 18 arranged at radially outside of the stator 20. The rotor 12 includes a shaft 14 and a rotor core 16 fixed to radially outside of the shaft 14. Magnets (not shown) are held inside of the rotor core 16. The rotor 12 rotates about the axis O.

Next, referring to FIG. 1 to FIG. 4, the stator 20 will be explained. The stator 20 includes a stator core 22, coils 24, an outer cylinder 26, and a plurality of heat conducting parts 28 and 29.

The stator core 22 is comprised of e.g. a plurality of magnetic steel sheets stacked in the axial direction. The stator core 22 includes a cylindrical back yoke 30 and a plurality of teeth 32 projecting radially inside from the back yoke 30. In this embodiment, a total of twelve teeth 32 are arranged so as to align in the circumferential direction at substantially equal intervals.

The coils 24 are respectively wound around the teeth 32. Each coil 24 includes a coil end 24a at the axially front side and a coil end 24b at the axially rear side. The coil end 24a is a part of the coil 24 wound around the teeth 32, which projects axially frontward from the tooth 32. On the other hand, the coil end 24b is a part of the coil 24 wound around the teeth 32, which projects axially rearward from the teeth 32.

The outer cylinder 26 is a cylindrical member made of a non-magnetic material such as aluminum or copper. The outer cylinder 26 is arranged so as to surround the back yoke 30 from radially outside, and fixed to the back yoke 30 by e.g. shrinkage fit. The fan 18 generates a flow of air toward the outer cylinder 26, thereby can cool the outer cylinder 26.

The heat conducting parts 28 are arranged at axially front side of the coil ends 24a. In this embodiment, a total of twelve heat conducting parts 28 are arranged in the circumferential direction at substantially equal intervals so as to correspond to the positions of the teeth 32.

Each of the heat conducting parts 28 is a substantially square plate member having a predetermined thickness, and contacts the inner circumferential surface 26a of the outer cylinder 26 at its radially outer end face 28a. Further, each of the heat conducting parts 28 contacts the coil end 24a of the coil 24 wound around the corresponding tooth 32 at its axially rear end face 28b from axially front side.

On the other hand, the heat conducting parts 29 are arranged at axially rear side of the coil ends 24b. Each of the heat conducting parts 29 has a configuration similar to the above-mentioned heat conducting part 28. Specifically, a total of twelve heat conducting parts 29 are arranged in the circumferential direction at substantially equal intervals so as to correspond to the positions of the teeth 32.

Each of the heat conducting parts 29 contacts the inner circumferential surface 26a of the outer cylinder 26 at its radially outer end face 29a. Further, each of the heat conducting parts 29 contacts the coil end 24b of the coil 24 wound around the corresponding tooth 32 at its axially front end face 29b from axially rear side.

For example, one of the heat conducting parts 28 and 29 are integrally formed at the inner circumferential surface 26a of the outer cylinder 26, while the others are fabricated from independent members separated from the outer cylinder 26, and fixed to the inner circumferential surface 26a of the outer cylinder 26 by e.g. welding or adhesion.

The heat conducting parts 28 and 29 are preferably made of non-magnetic material such as aluminum or copper in order to prevent an eddy current from being generated therein. However, the heat conducting parts 28 and 29 may be made of magnetic material. Further, each of the heat conducting parts 28 and 29 is preferably made of material having high thermal conductivity.

Thus, in this embodiment, the heat conducting parts 28, 29 are provided so as to contact both the outer cylinder 26 and the coil ends 24a, 24b of the coils 24. According to this configuration, part of heat generated at the coils 24 during the operation of the motor 10 conducts to the outer cylinder 26 through the heat conducting parts 28, 29, and is dissipated to the outside air from the outer cylinder 26. Therefore, it is possible to improve the heat dissipation effect of the stator 20.

Further, in this embodiment, the heat conducting parts 28 which contact the coil ends 24a and heat conducting parts 29 which contact the coil ends 24b are provided. According to this configuration, it is possible to remove heat from the coil ends 24a and 24b at both sides in the axial direction of the coils 24 through the heat conducting parts 28 and 29 respectively, so the heat dissipating effect of the stator 20 can be improved more effectively.

Figure 5:
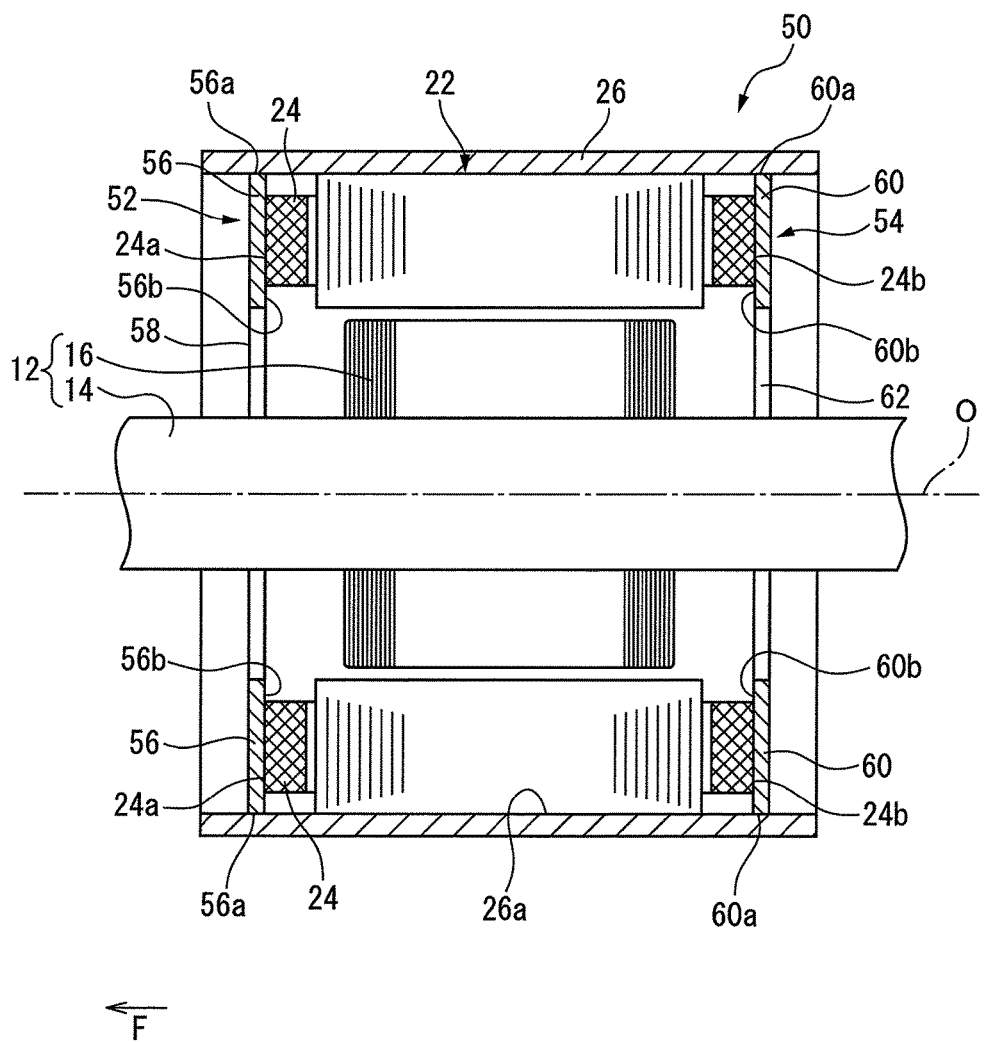
FIG. 5 is a side cross-sectional view of a motor according to another embodiment of the invention.

Next, referring to FIG. 5 to FIG. 7, a motor 40 according to another embodiment will be explained. Note that, in various embodiments explained below, elements similar to those in the already-explained embodiments will be assigned the same reference numerals, and detailed explanations thereof will be omitted.

The motor 40 includes a stator 50 and the rotor 12 rotatably arranged at radially inside of the stator 50. The stator 50 includes the stator core 22, the coils 24, the outer cylinder 26, and heat conducting rings 52 and 54.

The heat conducting ring 52 is a ring-shaped plate member having a predetermined thickness, and is arranged at axially front side of the coil ends 24a. Specifically, the heat conducting ring 52 includes heat conducting parts 56 and connecting parts 58. In this embodiment, a total of twelve heat conducting parts 56 are arranged in the circumferential direction at substantially equal intervals so as to correspond to the positions of the teeth 32.

Each of the heat conducting parts 56 is a substantially square plate member, and contacts the inner circumferential surface 26a of the outer cylinder 26 at its radially outer end face 56a. Further, each of the heat conducting parts 56 contacts the coil end 24a of the coil 24 wound around the corresponding tooth 32 at its axially rear end face 56b from axially front side. In this embodiment, the radial direction width $W_1$ of each heat conducting part 56 is set to be larger than the radial direction width $W_2$ of each connecting part 58.

Each of the connecting parts 58 is a substantially arc-shaped plate member, and extends in the circumferential direction between two heat conducting parts 56 adjoining each other in the circumferential direction. The connecting part 58 is integrally connected at one end in the circumferential direction to one heat conducting part 56 positioned at one side in the circumferential direction, while is integrally connected at the other end in the circumferential direction to the other heat conducting part 56 positioned at the other side in the circumferential direction.

Thus, in this embodiment, a total of twelve connecting parts 58 are arranged in the circumferential direction in series. Each of the connecting parts 58 is arranged so that its outer circumferential surface 58a contacts the inner circumferential surface 26a of the outer cylinder 26.

In this way, the end faces 56a of the heat conducting parts 56 and the outer circumferential surfaces 58a of the connecting parts 58 define a cylindrical outer circumferential surface 52a of the heat conducting ring 52. The outer circumferential surface 52a surface-contacts the inner circumferential surface 26a of the outer cylinder 26.

On the other hand, the heat conducting ring 54 is arranged at axially rear side of the coil ends 24b, and has a configuration similar as the above-mentioned heat conducting ring 52. Specifically, the heat conducting ring 54 includes a total of twelve heat conducting parts 60 arranged in the circumferential direction at substantially equal intervals so as to correspond to the positions of the teeth 32; and a total of twelve connecting parts 62, each of which extends between two heat conducting parts 60 adjoining each other in the circumferential direction.

Each of the heat conducting parts 60 contacts the inner circumferential surface 26a of the outer cylinder 26 at its radially outer end face 60a, while contacts the coil end 24b of the coil 24 wound around the corresponding tooth 32 at its axially front end face 60b from axially rear side. Further, the radial direction width $W_1$ of each heat conducting part 60 is set to be larger than the radial direction width $W_2$ of each connecting part 62.

Each of the connecting parts 62 is integrally connected at one end in the circumferential direction to one heat conducting part 60 positioned at one side in the circumferential direction, while is integrally connected at the other end in the circumferential direction to the other heat conducting part 60 positioned at the other side in the circumferential direction. Each connecting part 62 is arranged so that its outer circumferential surface (not shown) contacts the inner circumferential surface 26a of the outer cylinder 26.

In this way, the end faces 60a of the heat conducting parts 60 and the outer circumferential surfaces of the connecting parts 62 define a cylindrical outer circumferential surface (not shown) of the heat conducting ring 54, which surface-contacts the inner circumferential surface 26a of the outer cylinder 26.

Note that, the heat conducting rings 52 and 54 may be integrally formed at the inner circumferential surface 26a of the outer cylinder 26. Alternatively, the heat conducting rings 52 and 54 may be made from independent members separated from the outer cylinder 26, and be fixed to the inner circumferential surface 26a of the outer cylinder 26 by welding or shrinkage fit, etc. The heat conducting rings 52 and 54 are preferably made of non-magnetic material such as aluminum or copper, but may be made of magnetic material. Further, the heat conducting rings 52 and 54 are preferably made of material having high thermal conductivity.

In this embodiment, the heat conducting parts 56, 60 are provided so as to contact both the outer cylinder 26 and the coil ends 24a, 24b of the coils 24. According to this configuration, part of the heat generated at the coils 24 during the operation of the motor 40 conducts to the outer cylinder 26 through the heat conducting parts 56 and 60, and is dissipated from the outer cylinder 26 to the outside air. Therefore, the heat dissipating effect of the stator 50 can be improved.

Further, in this embodiment, a ring-shaped heat conducting ring 52 (54) is constituted by the connecting parts 58 (62), each of which extends between two heat conducting parts 56 (60) adjoining each other in the circumferential direction. In addition, the outer circumferential surface 52a of the heat conducting ring 52 (54) contacts the inner circumferential surface 26a of the outer cylinder 26.

According to this configuration, if the outer cylinder 26 is fixed to the stator core 22 by e.g. shrinkage fit, the ring-shaped heat conducting rings 52 and 54 can contact the inner circumferential surface 26a of the deforming outer cylinder 26 so as to reinforce the outer cylinder 26, thereby can prevent the outer cylinder 26 from being inappropriately deformed (for example, deformed into a non-circular shape).

Further, each connecting part 58 (62) is connected to the heat conducting part 56 (60), and its outer circumferential surface 58a contacts the inner circumferential surface 26a of the outer cylinder 26. Due to this, part of heat conducted to the heat conducting parts 56, 60 can be conducted to the outer cylinder 26 through the connecting parts 58, 62. Therefore, the heat dissipating effect of the stator 50 can be improved more effectively.

Further, in this embodiment, the heat conducting ring 52 which contacts the coil ends 24a and the heat conducting ring 54 which contacts the coil ends 24b are provided. According to this configuration, it is possible to remove heat from the coil ends 24a and 24b at both sides in the axial direction of the coils 24 through the heat conducting rings 52 and 54, so the heat dissipating effect of the stator 50 can be improved more effectively.

Further, in this embodiment, the radial direction width $W_1$ of each heat conducting part 56 (60) is set to be larger than the radial direction width $W_2$ of each connecting part 58 (62). According to this configuration, since the heat conducting ring 52 (54) can be configured to have an outer shape similar to the stator core 22, the component of the stator core 22 can be utilized for the heat conducting ring 52 or 54.

This effect will be explained below. The stator core 22 is comprised of a plurality of electrical steel sheets, each of which includes first parts which form the teeth 32 and second parts which form the back yoke 30.

Figure 3:
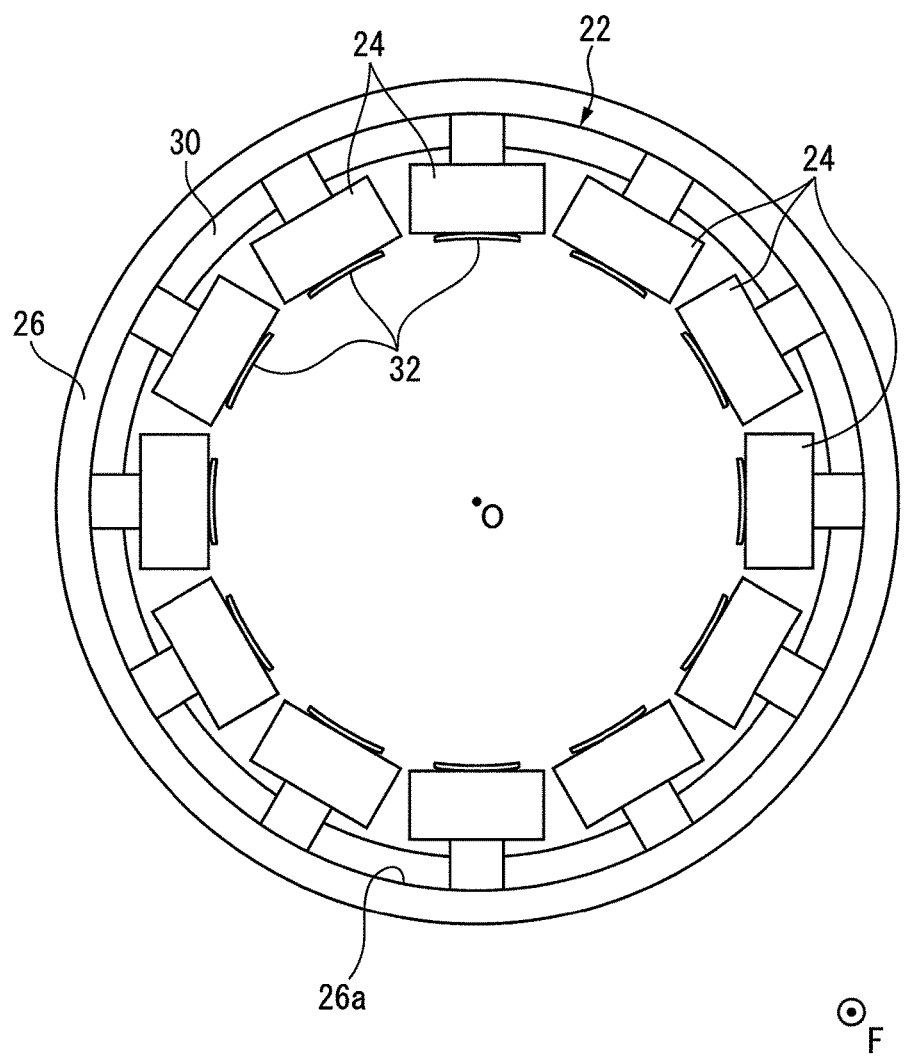
FIG. 3 is a view of the stator shown in FIG. 2, in which the heat conducting parts are omitted.

As clearly seen from FIG. 3, since the radial direction width of each tooth 32 is larger than that of the back yoke 30, the radial direction width of each of the first parts of the electrical steel sheet is larger than that of the second parts of the electrical steel sheet. Accordingly, the first part and the second part of the electrical steel sheet respectively have dimensions similar to the heat conducting part 56 (60) and connecting part 58 (62).

Therefore, the electrical steel sheet, which constitutes the stator core 22, can be utilized for the heat conducting ring 52 (54). According to this configuration, it is possible to reduce the number of components, so the manufacturing cost of the stator 50 can be reduced.

Figure 8:
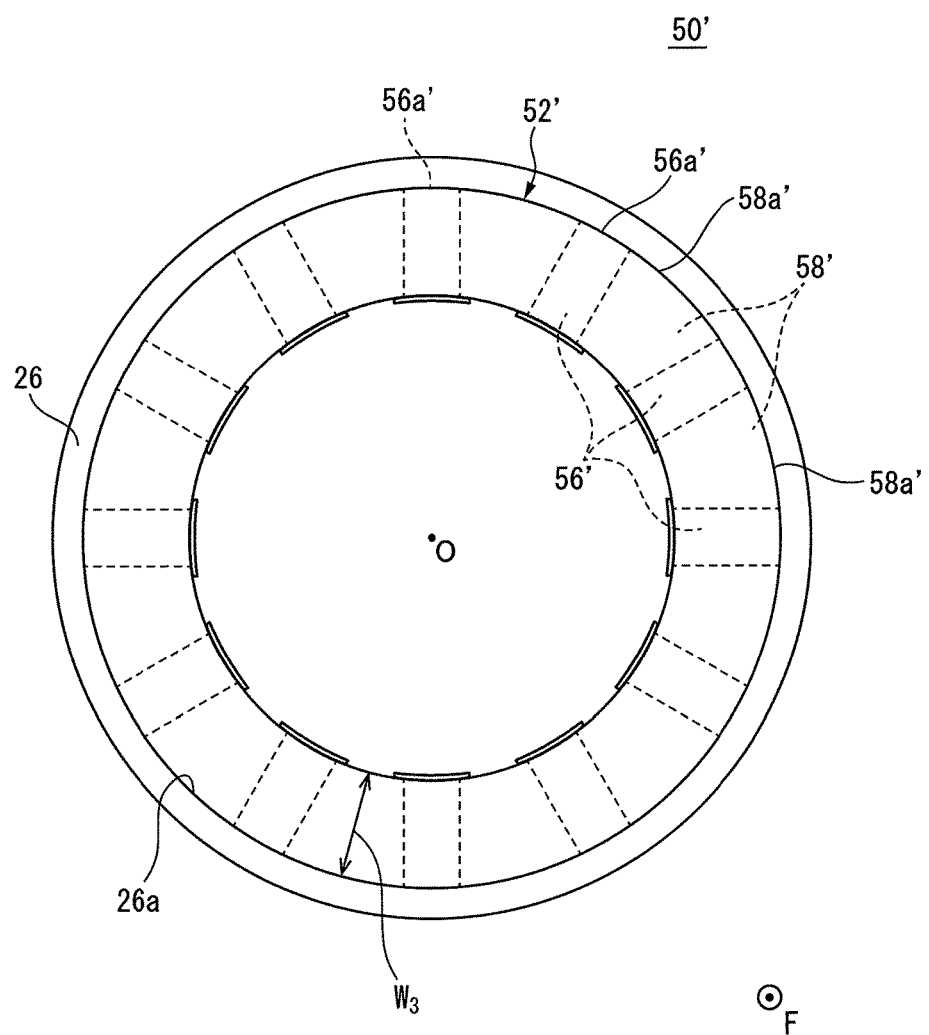
FIG. 8 is a view of the stator according to another embodiment of the invention as seen from the axially front side.
Figure 9:
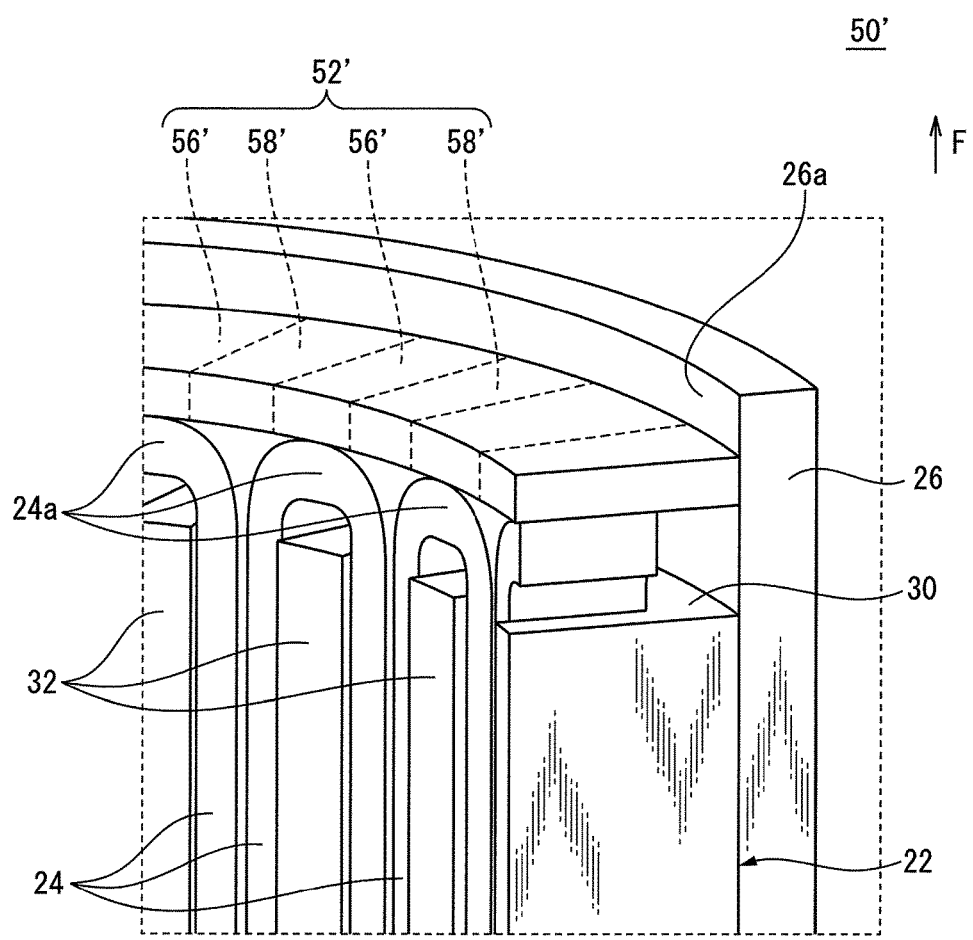
FIG. 9 is a perspective cross-sectional view of a part of the stator shown in FIG. 8.

Note that, in the above-mentioned embodiment, the radial direction width $W_1$ of each heat conducting part 56 (60) is set to be larger than the radial direction width $W_2$ of each connecting part 58 (62). However, the radial direction width of the heat conducting part may be set to be equal to that of the connecting part. Such an embodiment is shown in FIG. 8 and FIG. 9.

The stator 50' according to this embodiment includes a heat conducting ring 52'. The heat conducting ring 52' is a modification of the heat conducting ring 52 shown in FIG. 5 to FIG. 7, and is comprised of a ring-shaped plate member. The heat conducting ring 52' includes heat conducting parts 56' and connecting parts 58'.

Each of the heat conducting parts 56' contacts the inner circumferential surface 26a of the outer cylinder 26 at its radially outer end face 56a', while contacts the coil end 24a of the coil 24 wound around the corresponding teeth 32 at its axially rear end face (not shown) from axially front side. Each of the connecting parts 58' extends in the circumferential direction between two heat conducting parts 56' adjoining each other in the circumferential direction, and is integrally connected to these heat conducting parts 56'.

In this embodiment, the heat conducting parts 56' and connecting parts 58' have common radial direction widths $W_3$. The heat conducting parts 56' and connecting parts 58' connected in the circumferential direction constitute the ring plate-shaped heat conducting ring 52'.

Such heat conducting ring 52' also can improve the heat dissipating effect of the stator 50', similar as the above-mentioned heat conducting ring 52, while can prevent the outer cylinder 26 from being unsuitably deformed (for example, into a non-circular shape) by e.g. shrinkage fit.

Figure 10:
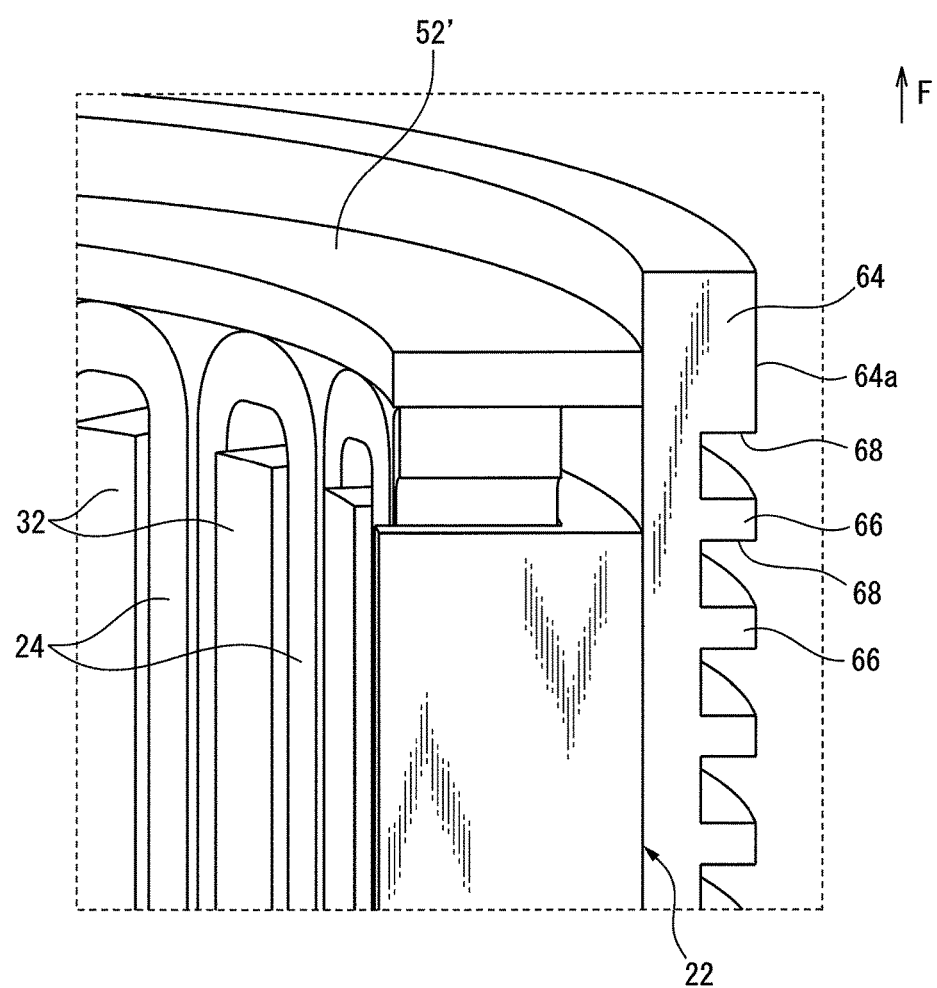
FIG. 10 is a view for explaining an outer cylinder according to another embodiment of the invention, which corresponds to FIG. 9.

Note that, various features can be added to the above-mentioned outer cylinder 26. Below, referring to FIG. 10 to FIG. 12, outer cylinders according to other embodiments will be explained. FIG. 10 shows an embodiment where an outer cylinder 64 is provided instead of the outer cylinder 26 in the embodiment shown in FIG. 9.

The outer cylinder 64 includes a plurality of grooves 68 formed at an outer circumferential surface 64a of the outer cylinder 64 so as to align in the axial direction. Each of the grooves 68 is provided to be recessed inward from the outer circumferential surface 64a, and extends in the circumferential direction. Two grooves 68 adjoining each other in the axial direction define a heat radiating fin 66. The heat dissipation effect of the outer cylinder 64 can be improved by the fins 66.

Figure 4:
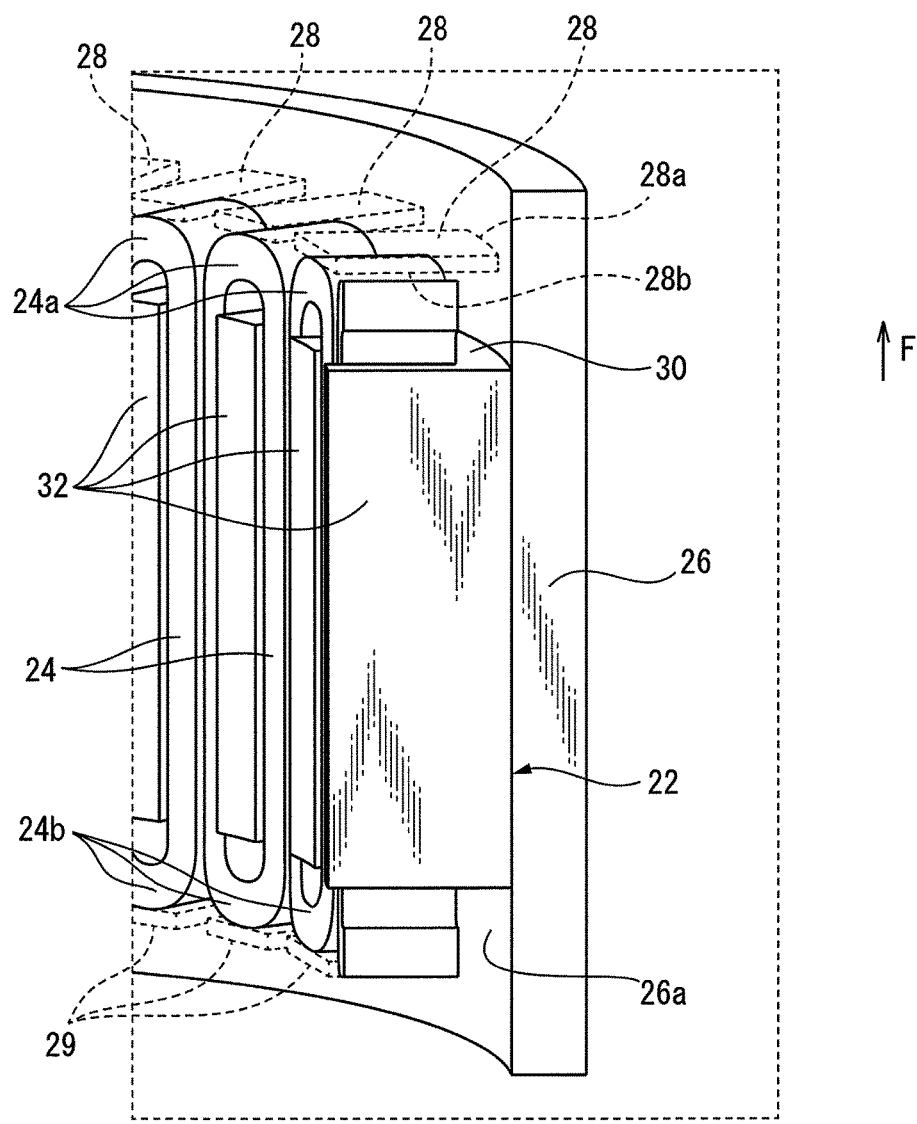
FIG. 4 is a perspective cross-sectional view of a part of the stator shown in FIG. 2, in which the heat conducting parts are indicated by dotted lines.
Figure 7:
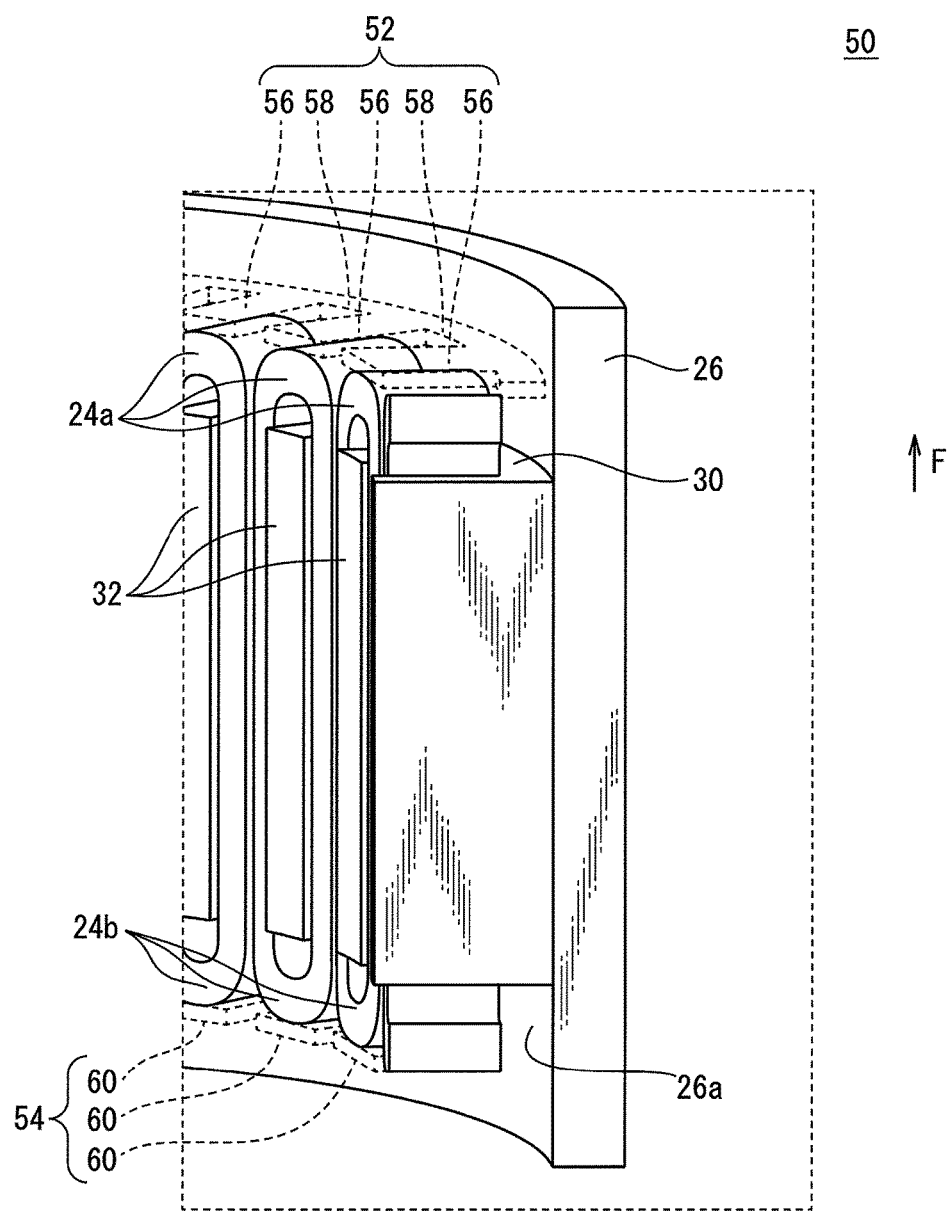
FIG. 7 is a perspective cross-sectional view of a part of the stator shown in FIG. 5, in which the heat conducting parts are indicated by dotted lines.

Note that, the outer cylinder 64 can also be applied to the embodiments shown in FIG. 4 and FIG. 7. In this case, at least one of the fins 66 (or grooves 68) is arranged to be adjacent to the heat conducting parts 28 or the heat conducting rings 52, 52' at radially outside thereof.

Figure 11:
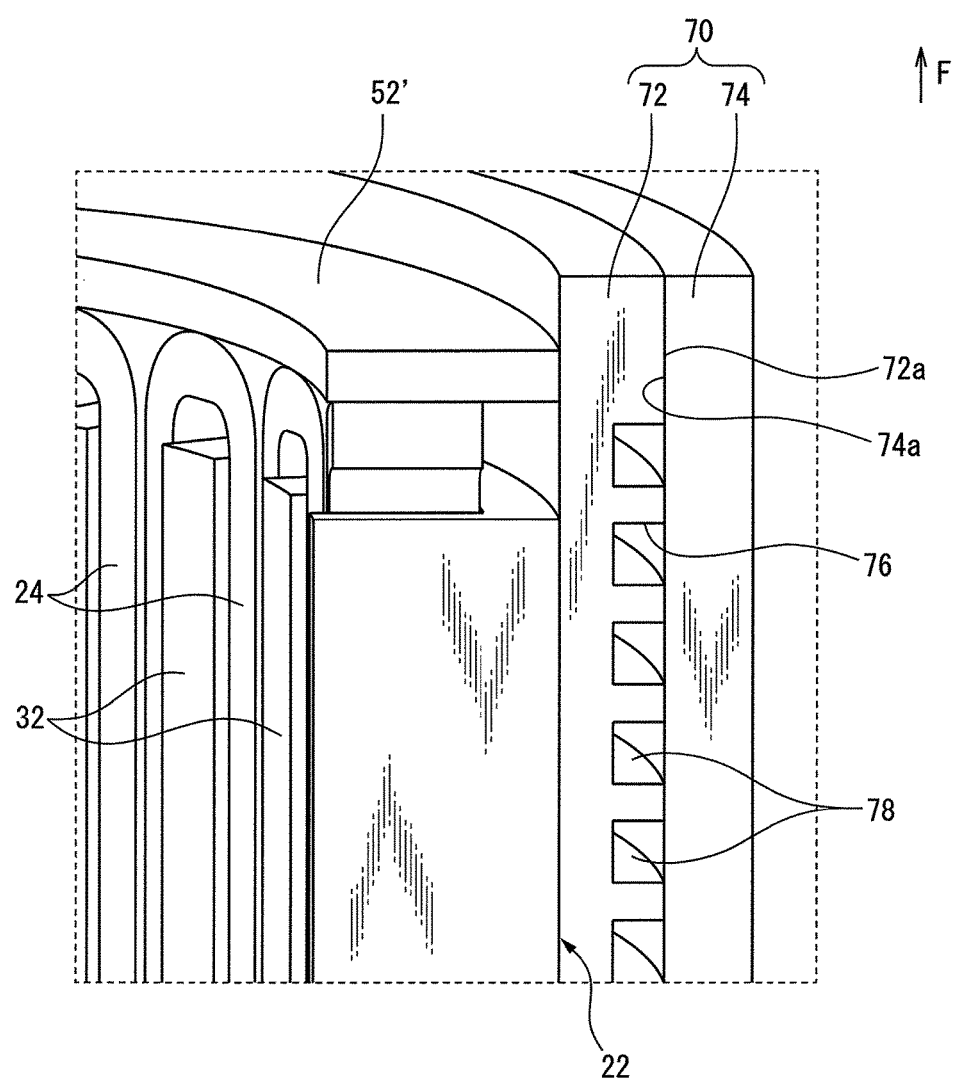
FIG. 11 is a view for explaining an outer cylinder according to still another embodiment of the invention, which corresponds to FIG. 9.

FIG. 11 shows an embodiment in which an outer cylinder assembly 70 is provided instead of the outer cylinder 26 in the embodiment shown in FIG. 9. The outer cylinder assembly 70 includes a first outer cylinder 72 and a second outer cylinder 74 which surrounds the first outer cylinder 72 from radially outside.

The first outer cylinder 72 includes a groove 76 at its outer circumferential surface 72a. The groove 76 is provided to be recessed inward from the outer circumferential surface 72a, and continuously extends around the outer circumferential surface 72a in a spiral manner.

The second outer cylinder 74 has a cylindrical inner circumferential surface 74a, and is arranged at radially outside of the first outer cylinder 72 so that the inner circumferential surface 74a surface-contacts the outer circumferential surface 72a of the first outer cylinder 72. A fluid path 78 extending in a spiral manner is defined by the groove 76 and the inner circumferential surface 74a.

The fluid path 78 is fluidly connected to a coolant supply apparatus (not shown) installed at the outside of the stator 50'. Coolant supplied from the coolant supply apparatus passes through the fluid path 78. It is possible to cool the outer cylinder assembly 70 by the coolant passing through the fluid path 78 in this way, so the heat dissipating ability of the stator 50' can be improved.

Note that, the outer cylinder assembly 70 can also be applied to the embodiments shown in FIG. 4 and FIG. 7. In this case, the fluid path 78 is formed to extend so as to be adjacent to the heat conducting parts 28 or the heat conducting rings 52, 52' at radially outside thereof.

Figure 12:
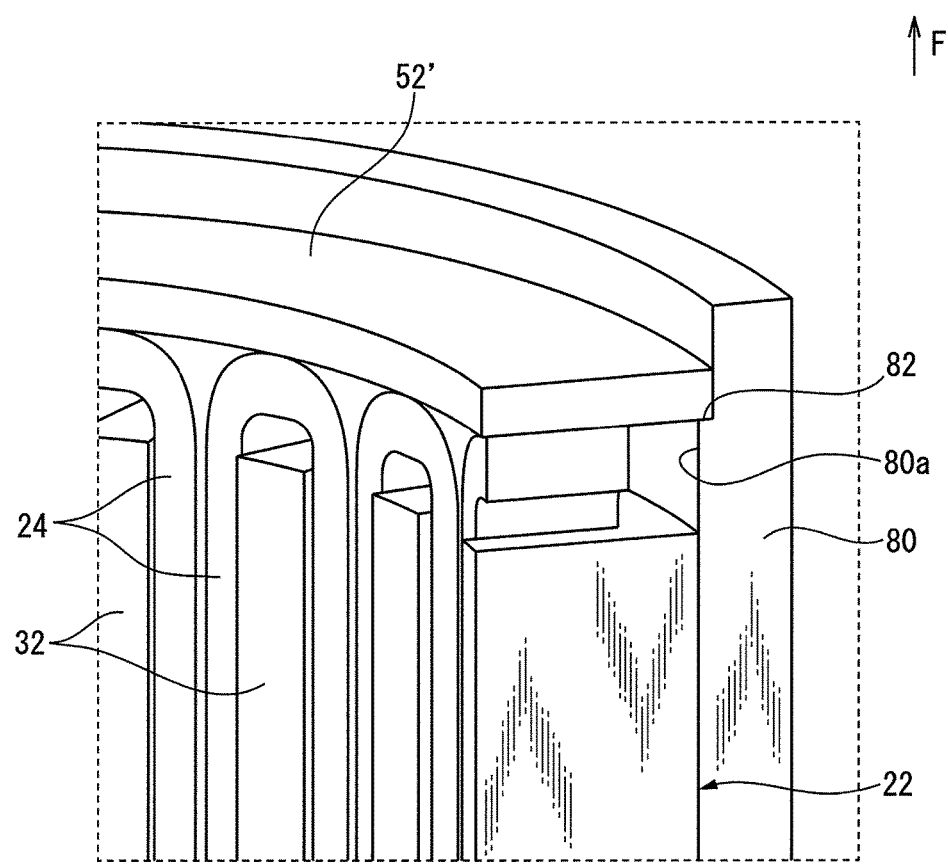
FIG. 12 is a view for explaining an outer cylinder according to still another embodiment of the invention, which corresponds to FIG. 9.

FIG. 12 shows an embodiment in which an outer cylinder 80 is provided instead of the outer cylinder 26 in the embodiment shown in FIG. 9. The outer cylinder 80 has a step 82 formed at an inner circumferential surface 80a of the outer cylinder 80. The step 82 extends in the circumferential direction over the entire circumference of the inner circumferential surface 80a. The heat conducting ring 52' is arranged on the step 82.

According to this configuration, the manufacturer can suitably and easily position the heat conducting ring 52' with respect to the outer cylinder 80 by placing the heat conducting ring 52' on the step 82 before fixing the outer cylinder 80 to the stator core 22 by e.g. shrinkage fit, when producing the stator 50'. Note that, the outer cylinder 80 shown in FIG. 11 can also be applied to the embodiments shown in FIG. 4 and FIG. 7.

Figure 13:
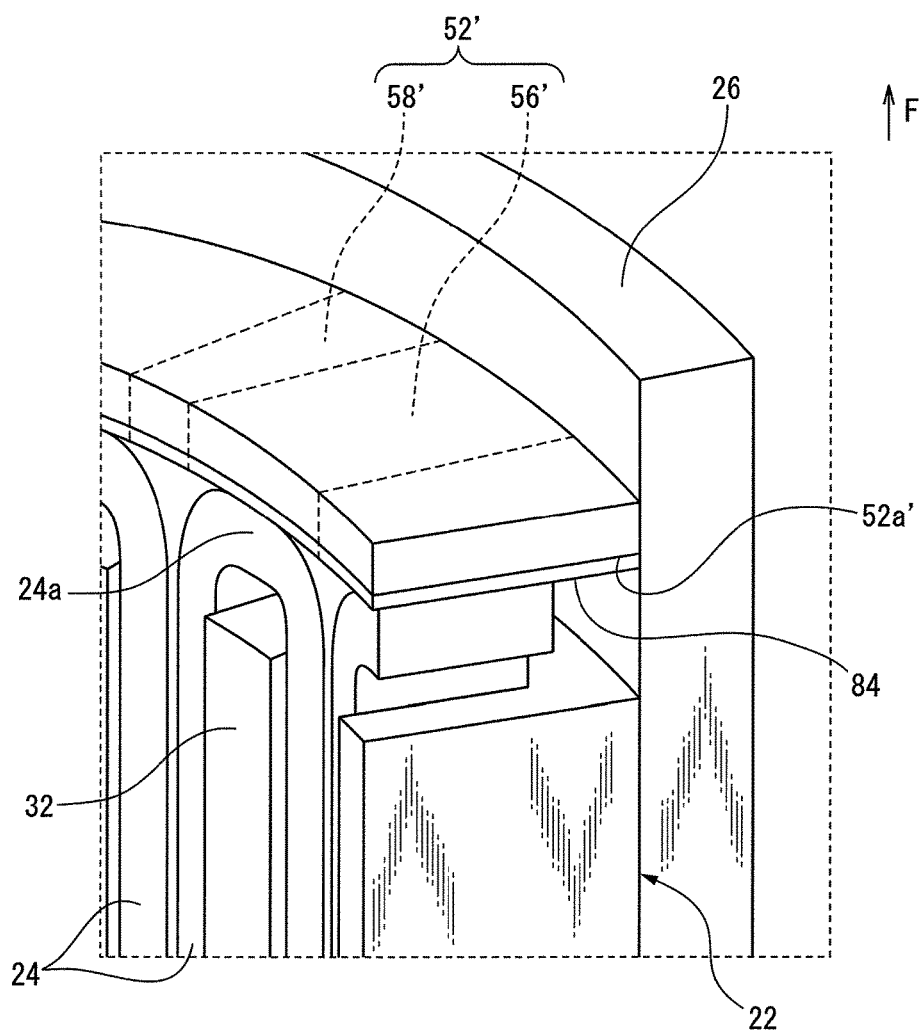
FIG. 13 is a view for explaining an insulator provided at the heating conducting part, which corresponds to FIG. 9.

Note that, the above-mentioned heat conducting parts 28, 29, 56, 60, and 56' may include insulators at their part where they contact the coil ends 24a, 24b. Such an embodiment is shown in FIG. 13. In this embodiment, an insulator 84 is coated over an axially rear end face 52a' of the heat conducting ring 52' (i.e., the heat conducting parts 56' and connecting parts 58').

The insulator 84 electrically insulates the heat conducting parts 56' from the coil ends 24a. Due to this, it is possible to prevent a short-circuit current from being generated at the heat conducting ring 52', when voltage is applied to the coils 24.

Preferably, the insulator 84 is made of material having high thermal conductivity. Due to this, it is possible to avoid the impairment of the heat conduction from the coil ends 24a to the heat conducting parts 56' due to the insulator 84.

Note that, in the embodiment shown in FIG. 1, the heat conducting parts 28 and 29 are provided. However, only one of the heat conducting parts 28 and heat conducting parts 29 may be provided. Similarly, in the embodiment shown in FIG. 5, only one of the heat conducting rings 52 and 54 may be provided.

Further, in the above-mentioned embodiments, each of the heat conducting rings 52, 54, and 52' is a unitary ring plate. However, the heat conducting ring 52, 54, or 52' may be divided into a plurality of sections in the circumferential direction.

Figure 6:
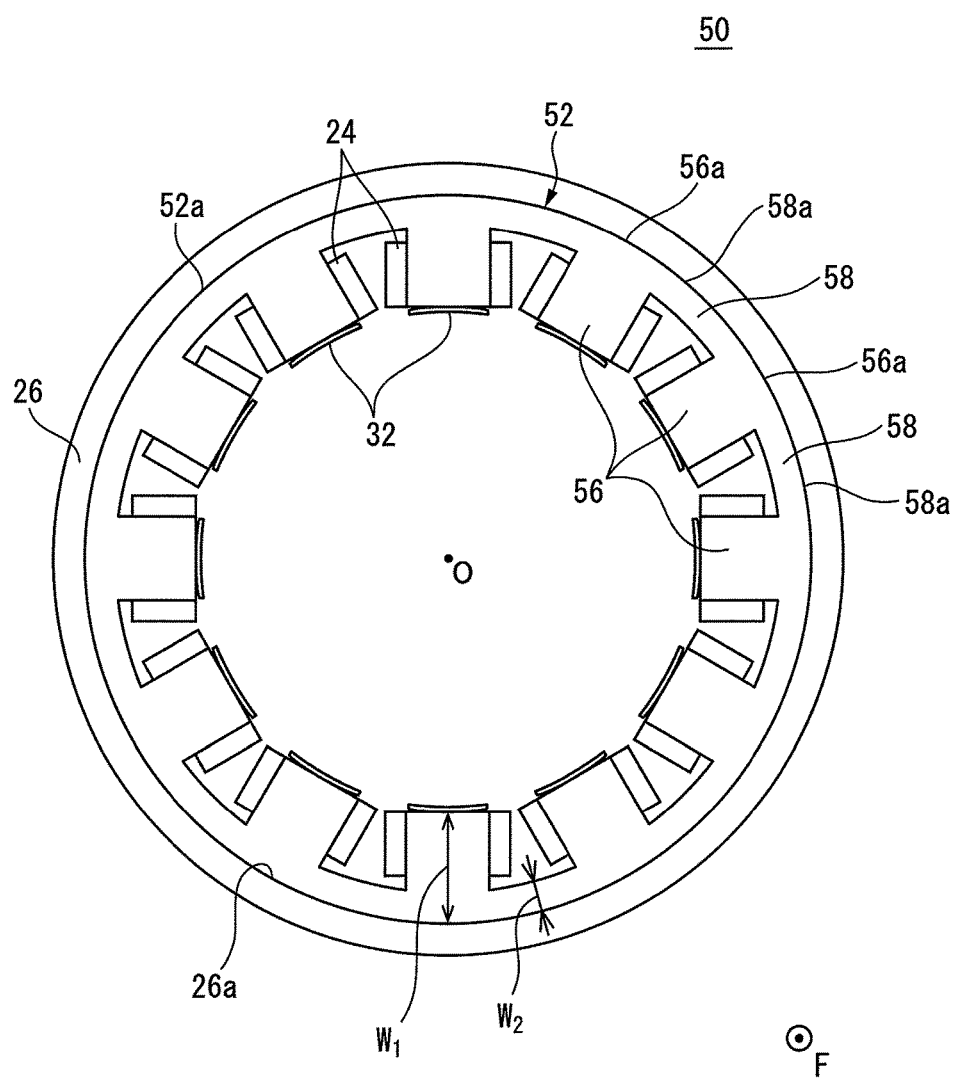
FIG. 6 is a view of the stator shown in FIG. 5 as seen from the axially front side.

For example, in the embodiment shown in FIG. 6, the heat conducting ring 52 may include a plurality of ring segments arranged in the circumferential direction, wherein each of the ring segments may include a heat conducting part 56 and a connecting part 58 extending from the heat conducting part 56 toward one side in the circumferential direction.

Further, in the above embodiments, the inside of the outer cylinder 26 may be filled with a resin so as to cover the coil 24, thereby a so-called molded motor may be constituted. For example, if the inside of the outer cylinder 26 is filled with resin to constitute a molded motor in the embodiments shown in FIG. 6 and FIG. 8, the heat conducting rings 52, 54, and 52' can effectively prevent unsuitable deformation of the outer cylinder due to the resin.

More specifically, if the inside of the outer cylinder 26 is filled with resin, the resin and outer cylinder 26 greatly differ in coefficient of linear expansion. Further, the resin used for the molded motor is generally a thermosetting resin, and is made to cure by being heated to a high temperature. Therefore, when curing the resin, and then returning it to ordinary temperature, the resin and the outer cylinder 26 pull against each other, thereby the outer cylinder 26 is deformed.

In this case, if the heat conducting ring 52, 54, 52' is arranged as shown in FIG. 6 and FIG. 8, the heat conducting ring 52, 54, 52' will contact the inner circumferential surface 26a of a deforming outer cylinder 26 to reinforce the outer cylinder 26, and prevent the outer cylinder 26 from being deformed unsuitably (for example, deformed into a non-circular shape) due to the resin.

Further, in the embodiments shown in FIG. 6 and FIG. 8, the outer cylinder 26 may be shrink-fit over the stator core 22 at first, and then the heat conducting ring 52, 54, 52' may be fixed by shrinkage fit. By assembling in this way, it is possible to correct the deformation of the outer cylinder 26 by the heat conducting ring 52, 54, 52', when the outer cylinder 26 is deformed by shrinkage fit.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

The invention claimed is:

1. A stator of a motor, comprising:
   a stator core including a cylindrical back yoke and a tooth projecting radially inside from the back yoke;
   a coil wound around the tooth, the coil having a coil end;
   an outer cylinder which surrounds the back yoke;
   a heat conducting ring located at an axially front side of the coil end, the heat conducting ring having a heat conducting part and a connecting part, the
   heat conducting part has an end face that directly contacts an inner circumferential surface of the outer cylinder and directly contacts the coil end of the coil; and the connecting part extends in the circumferential direction of the outer cylinder so as to be integrally connected to the heat conducting part, the connecting part having an outer circumferential surface directly contacting the inner circumferential surface of the outer cylinder, the connecting part having a radial direction width smaller than that of the heat conducting part.

2. The stator according to claim 1, wherein the stator core includes a plurality of teeth arranged so as to align in the circumferential direction, wherein
   the stator comprises a plurality of heat conducting parts arranged so as to align in the circumferential direction, and wherein
   each of the plurality of heat conducting parts contacts the coil end of the coil wound around each of the plurality of teeth.

3. The stator according to claim 1, further comprising a connecting part extending in the circumferential direction of the outer cylinder so as to be connected to the heat conducting part, the connecting part contacting the inner circumferential surface of the outer cylinder.

4. The stator according to claim 3, wherein the heat conducting part has a radial direction width equal to or larger than that of the connecting part.

5. The stator according to claim 3, wherein a step is formed at the inner circumferential surface of the outer cylinder so as to extend in the circumferential direction, and wherein the heat conducting part and the connecting part are arranged on the step.

6. The stator according to claim 1, wherein a fin for dissipating heat or a fluid path for passage of a coolant is formed at an outer circumferential surface of the outer cylinder.

7. The stator according to claim 1, wherein the heat conducting part includes an insulator at a part of the heat conducting part where the heat conducting part contacts the coil end.

8. A motor comprising a stator according to claim 1.

9. The motor according to claim 8 further comprising a fan for cooling the outer cylinder.

\* \* \* \* \*